UNITED STATES PATENT OFFICE.

OTIS BOYDEN, OF NEWARK, NEW JERSEY.

IMPROVEMENT IN ALLOYS OF IRON, ZINC, AND NICKEL.

Specification forming part of Letters Patent No. 8,114, dated May 27, 1851.

*To all whom it may concern:*

Be it known that I, OTIS BOYDEN, of Newark, in the county of Essex and State of New Jersey, have invented a new Mode of Making Wrought or Malleable Cast-Iron, either direct from the ores or from ordinary cast-iron; and I do hereby declare that the following is a full and exact account of a description of said invention.

The nature of my invention consists in the manufacture of wrought or malleable cast-iron, either directly from the ores or from ordinary cast-iron, and the application of the following chemical agents—namely: first, metallic zinc, either pure or the ordinary spelter of commerce; second, an alloy of zinc and nickel. The application of these chemical agents consists in mixing them—that is, the zinc alone or combined with nickel in any manner and in proper quantities—with the crude iron, or with iron ores while in a fused state during the process of ordinary manufacture, or of any mode of manufacturing or purifying iron whatever.

In addition to the general use of the above agents, in their application to the purifying of iron and improving its qualities, the following is the particular mode of their use as invented by me. A convenient quantity of cast-iron is melted, and this is highly and properly alloyed with the said agents—one or both of them—according to the quantity of iron desired to be produced. After being so alloyed it is cast into small pieces or into bars, which may be easily broken into small pieces. Such pieces or fragments of alloyed iron are the vehicles of my agents, and most convenient for my application. For instance, a small and suitable amount of the first or of the two combined may be introduced into an ordinary puddling-furnace already charged, and by their simple introduction and mixture with such charge of cast-iron or ores in a fused state such iron may be made by the ordinary process into wrought or malleable iron having many superior qualities. These chemical agents in this vehicle may be similarly applied in an ordinary purifying or air furnace, or in an ordinary cupola-furnace, or in a furnace for making wrought-iron directly from the ore.

These agents may be applied separately or combined, according to the qualities which may be required in the iron, or according to the impurities necessary to be removed from the iron or ores used. If the zinc is alone used, it is in the proportion of from one to four per cent., according to the quality desired in the iron or its impurities. If the two are combined, it is the same quantity of zinc combined with one-fourth percentum of nickel, and this makes another quality of wrought or malleable iron.

By this invention many advantages are secured.

First. The iron is more rapidly and easily purified from all foreign admixture and impurities.

Second. The iron is more pure, dense, strong, ductile, and malleable.

Third. The qualities of the iron may be varied to suit any required purpose, being susceptible of special hardness or softness or other variations.

What I claim as my invention, and desire to secure by Letters Patent, is—

The making of wrought or malleable iron, either from ordinary iron or from the ore, by the use or application of metallic zinc or spelter, and by the use of zinc and nickel combined, as hereinbefore described and set forth.

OTIS BOYDEN.

Witnesses:
C. H. MEDISS,
A. S. HUBBELL.